May 17, 1949.  H. G. McILROY  2,470,256
QUICK ACTION COUPLING
Filed Oct. 1, 1945  2 Sheets-Sheet 1
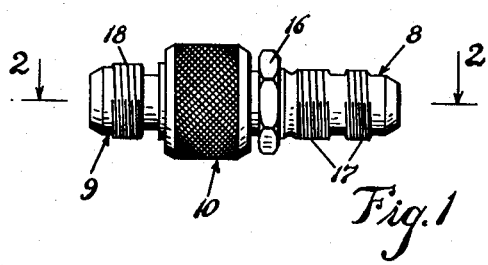
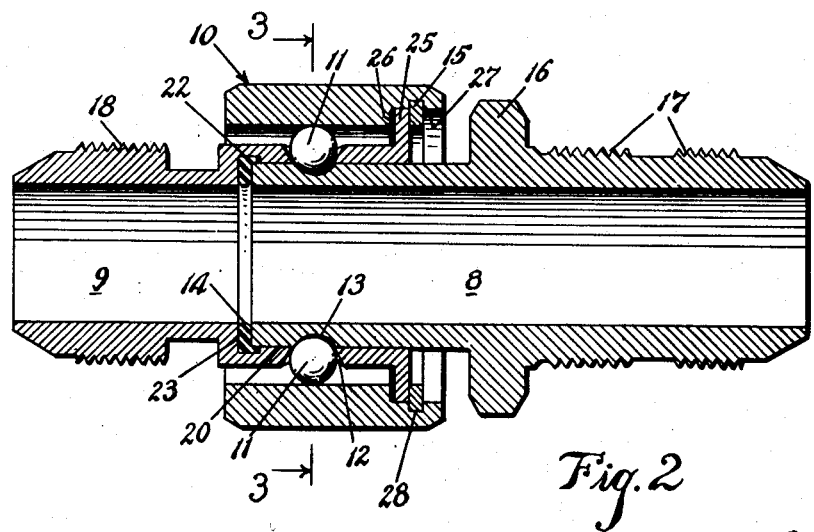
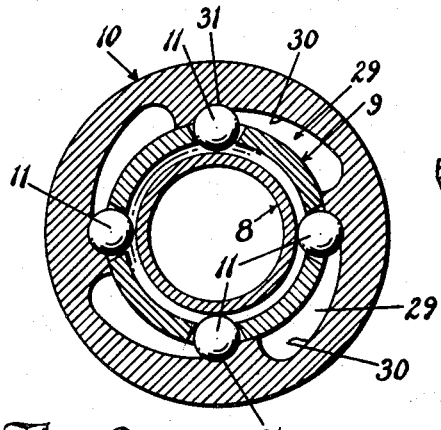
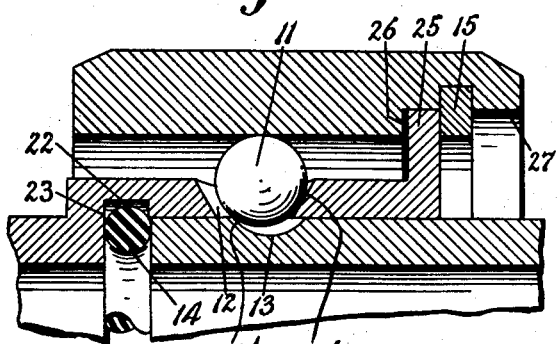
Inventor
Harold G. McIlroy
By R. S. Berry
Attorney May 17, 1949. H. G. McILROY 2,470,256
QUICK ACTION COUPLING
Filed Oct. 1, 1945 2 Sheets-Sheet 2

Inventor
Harold G. McIlroy
By R. S. Berry
Attorney

Patented May 17, 1949

2,470,256

UNITED STATES PATENT OFFICE 2,470,256

QUICK-ACTION COUPLING

Harold G. McIlroy, Burbank, Calif.

Application October 1, 1945, Serial No. 619,502

10 Claims. (Cl. 285—168)

This invention relates to couplings for effecting a quick connection and disconnection of fluid lines and other objects or members.

The primary purpose of this invention is to provide an improved quick action coupling which embodies the improvements and advantages as follows:

1. A quick and easy coupling and uncoupling action responsive to but a short turning movement, for example, one-fourth of a revolution, of one member of the coupling, which movement may be effected with one hand without use of a tool or tools.

2. Less bulk (especially length) and weight and greater compactness than quick action couplings heretofore provided.

3. A positive locking of male and female elements of the coupling in coupled relation through the instrumentality of a novel locking means consisting of but few parts and completely enclosed and carried by the female element of the coupling.

4. A locking means which in addition to locking the coupling members against coming apart acts to force them tightly together so that a fluid tight connection of such members is assured.

5. The provision of a novel detent means which prevents the locking elements from being jarred loose or otherwise being accidentally moved out of a position in which a reliable leak-proof connection is made.

6. The provision of means resiliently resisting the tightening of the coupling members whereby locking balls forming a part of the locking means will snap into locked position and will have a resilient action when in locked position thereby securely holding the coupling members together while making it possible to readily release them upon appropriate manipulation of the locking means.

7. A compact arrangement of parts which are separate from the one-piece male and female members, within and on the female member and subject to easy assembly and disassembly, being held assembled by means of a single snap ring.

8. A construction and arrangement which readily lends itself to a reliable sealing with a single sealing ring maintained in protected position in the female member of the coupling.

9. A simplicity of construction and design which make possible low production costs and the advantageous reduction of bulk, weight, and size of the coupling.

With the foregoing objects in view, together with such other objects and advantages as may subsequently appear, the invention resides in the parts and in the combination, construction and arrangement of parts hereinafter described and claimed, and illustrated by way of example in the accompanying drawing in which:

Fig. 1 is a side elevation of a coupling embodying the present invention;

Fig. 2 is an enlarged sectional view taken on the line 2—2 of Fig. 1;

Fig. 3 is a cross sectional view taken on the line 3—3 of Fig. 2;

Fig. 3a is a fragmentary sectional view similar to Fig. 3 showing the position of the parts of the coupling before being tightened and locked in coupled relation to one another;

Figure 4:
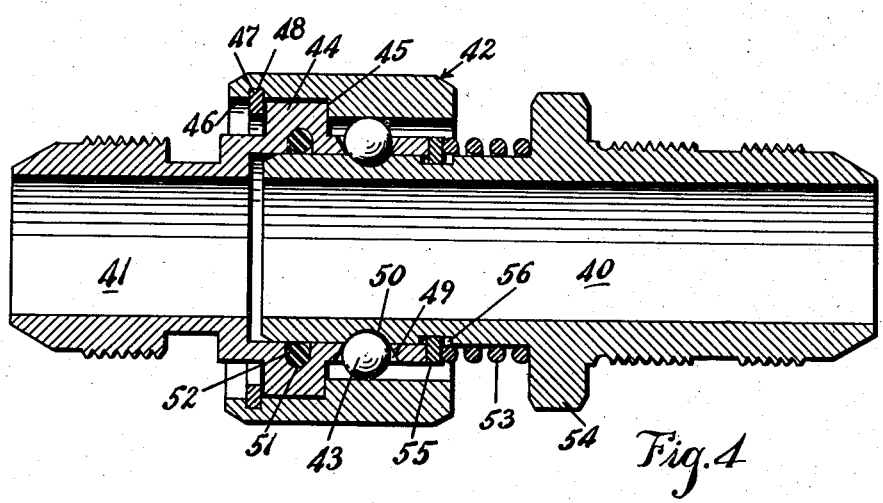
Fig. 4 is a longitudinal sectional view of a modified form of the coupling.

Referring to the drawings more specifically particularly Figs. 1 to 3a inclusive, it is seen that one form of coupling embodying my invention generally includes as the main parts thereof a male coupling member 8, a female coupling member 9, a cam ring or sleeve 10 rotatably carried by female member, locking balls 11 maintained in openings 12 in the female member by means of the cam ring and adapted to seat in a depression or groove 13 in the male member, an elastic sealing ring 14 and a snap ring 15 which rotatably secures the cam ring in place on the female member.

The male member 8 is provided with the usual faceted flange 16 whereby a wrench or like tool may be applied to connect and disconnect threaded portions 17 relative to a pipe or other object, not shown, and to which the coupling member is to be threadedly connected.

The female coupling member 9 is provided at one end with screw threads 18 whereby it may be threadedly connected with a pipe or other member not shown. The outer end portion of the bore of this female member is enlarged as at 20 for reception of the end of the male member 8 whereby the joined bores of such members will be of equal diameter with a substantially flush joint separated only by the elastic sealing ring. This ring is held in an internal annular groove 22 contiguous the shoulder 23 formed by the bore enlargement 20, whereby the ring will be compressed between the end of the male member 8 and the shoulder 23 to form a fluid tight seal between the male and female members. In this connection it should be noted in compressing the sealing ring, an annular part of the sealing ring spreads at the bottom of the groove 22 so as to surround the male member and thus additionally seal the joint of the coupling members.

At its outer end the coupling member 9 is provided with an annular flange 25 one side of which is adapted to abut an annular internal shoulder 26 formed at the inner end of an enlargement 27 of the bore of the cam ring or sleeve 10. The snap ring 15 fits in an internal groove 28 in said enlargement 27 and abuts the other side of the flange 25 thereby holding the cam ring on the female member subject to rotation thereon as necessary to move the locking balls 11 into and out of locking position, said balls being mounted in the openings 12 before the cam ring is mounted on the female member.

An important feature of this invention is the construction, relative arrangement and related functions of the cam elements of the cam ring 10, the ball retaining openings 12 in the female member 9, the ball receiving groove 13 in the male member 8, and the elastic sealing ring 14 whereby a resilient but reliable locking of the coupling members in leak-proof coupled relation is assured with provision for a quick and easy coupling and uncoupling action responsive to but a short turning movement of the cam ring effected with one hand.

Accordingly the ball receiving openings 12 in the female member are of such diameter that the balls 11 will extend but partly therethrough when the male member 8 is removed. These openings also having inwardly tapering walls the purpose of which will be hereinafter described.

The cam ring 10 is formed interiorly with a circular series of cam pockets 29 each encompassing one of the balls 11 and having a cam surface 30 past the high point of which a detent depression 31 is formed whereby the balls will snap into such depressions to "lock" the balls in locking position.

The male and female coupling members are constructed and arranged so that when an elastic sealing ring 14 of a predetermined thickness is employed as here shown and the male member is inserted into the female member, the inner end of the male member will contact and be stopped by the sealing ring in a position in which the groove 13 is somewhat off center from the openings 12 and the centers of the protruding parts of the balls 11 as shown in Fig. 3a. At this time the balls 11 bear against the forward side wall 13' of the groove 13 and do not seat against the bottom of said groove, and at the same time bear against the outer sides 12' of the openings 12 and are slightly spaced away from contact with the opposite sides of said openings. The cam ring 10 at this time is releasing position with the balls 11 in the deepest parts of the pockets 29 opposite the low points of the cam surfaces 30 and the two coupling members are therefore ready to be forced closer together and locked in accordance with my invention.

Upon now turning the cam ring (about ¼ of a revolution) the cam surfaces 30 will force the balls 11 radially inwardly. In so moving these balls are moved forwardly due to bearing on the inclined walls 12' of openings 12 and therefore push against the wall 13' of the groove 13 so that the male member is forced inwardly against the sealing ring 14 which then assumes the position shown in Fig. 3. This action is resisted by the elastic ring 14 which therefore sets up a resilient force so that when the balls reach the depressions 31 just past the "high" points of the cam surfaces, they will resiliently snap into said depressions and lock the coupling members against being jarred loose or otherwise accidentally loosened or uncoupled. Due to the compressing of the elastic sealing ring 14 the coupling members and the parts thereof effecting the locking action are held under a resilient force and thereby securely locked but may be readily released for separation upon making a short turn of the cam ring such that the balls may be forced radially out of the groove 13 into the pockets 29 incident to withdrawing the male member from the female member.

As shown in Fig. 4 a modified form of the coupling hereof includes a male member 40 and a female member 41, a cam ring 42 and balls 43 substantially of the same construction and arrangement as the corresponding parts of the first described form of coupling.

The female member 41 is provided with an annular external flange 44 spaced inwardly from the outer end thereof and which rests against a shoulder 45 formed in a counterbore 46 of the cam ring 42. A snap ring 47 seats in a groove 48 in the cam ring and bears against the flange 44 so as to hold the cam ring on the female member. The openings 49 for the balls and the groove 50 in the male member are constructed and arranged in the same manner as shown in Figs. 1 to 3a inclusive. The flange 44 provides sufficient stock in the female member to accommodate a sealing ring groove 51 for an elastic sealing ring 52 of normally circular cross section. This ring remains in the groove 51 and will surround and form a fluid-tight seal around the male member.

A resilient action is provided in this form of coupling by means of a coiled spring 53 carried on the male member 40. One end of this spring abuts a flange 54 on the member 40 while the other end abuts a snap 55 mounted in a groove 56 in the male member, said ring 55 being arranged to be moved in the groove 56 axially of the male member and to abut the outer end of the female member 41. When the coupling members 40 and 41 are initially connected the snap ring 55 is held by the spring 53 against the outer side of the groove 56 and will act as stop to cause the groove 50 to come to a position not in full registry with the openings 49 whereby the balls, openings and groove will assume the same positions as the corresponding parts shown in Fig. 3a. The cam ring is now turned in the same manner as previously described and through the balls will resiliently force the coupling members together and lock them in coupled relation as shown in Fig. 4. The ring 56 is moved axially as the spring 53 is compressed by the action of the balls 43 being forced into the bottom of the groove 50 of the male member 40.

Figure 5:
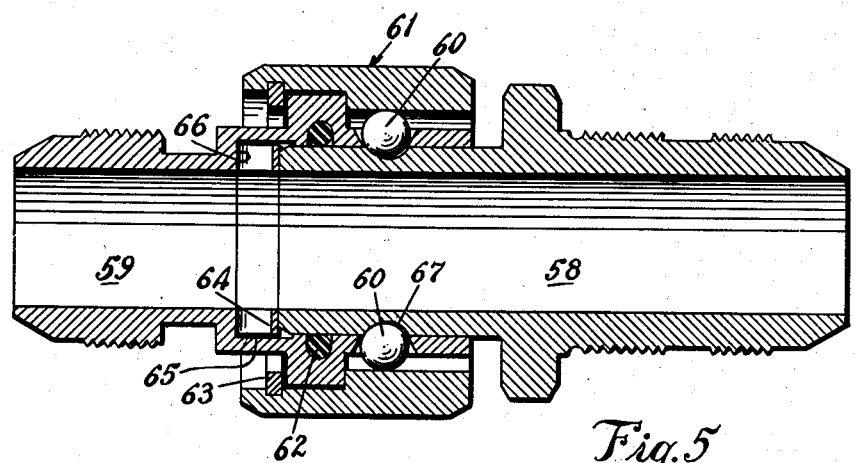
Fig. 5 is a longitudinal sectional view of another modified form of the coupling.
Figure 6:
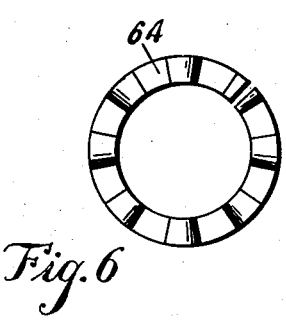
Fig. 6 is an elevational view of an annular spring used in the form of coupling shown in Fig. 5.
Figure 7:
Fig. 7 is a fragmentary edge view showing the formation of the annular spring locking in the direction of the arrow 7 in Fig. 6.

Another modification of coupling hereof as shown in Figs. 5, 6 and 7 includes male and female coupling members 58 and 59, locking balls 60, a cam ring 61, a sealing ring 62 and a snap ring 63 identical with corresponding parts shown in Fig. 4 except that the spring 53, groove 55 and snap ring 56 are omitted from the male member 58.

Instead of spring 53 I employ an annular spring 64 in the form of a split marcel ring mounted in an internal groove 65 in female member 59 and arranged so that opposite sides thereof will abut a shoulder 66 on the female member and the end of the male member respectively. This annular marcel spring is dimensioned so that before being compressed it will stop the telescopically engaged coupling members with the balls 62 seated on the outer side of the groove 67 in the male member in the same manner as shown in Fig. 3a whereby on turning the cam ring the balls will force the male member against the spring and compress it so that a resilient action is set up and the balls will snap in the detent depressions which are provided in the ring 61 in the same manner as shown in Fig. 3.

In all other respects this form of coupling is operated in the same manner as the first described form and has the same advantages with possibly a longer life in view of the use of a metal spring instead of the elastic sealing ring as used in the first described form of coupling.

It should be noted that in each form of the coupling hereof the balls are forced against the bottom of the groove in the male member by the cam ring just before the balls snap into the depression 31 in the cam ring. However when the balls become seated in these depressions they will be somewhat forwardly offset from the center of the groove and spaced somewhat from the bottom of the groove as clearly shown in Figs. 2 and 3, said balls then riding against the forward side 13' of the groove. This affords a space between the balls and the bottom of the groove whereby the balls may be moved radially inwardly sufficiently to move out of the depressions when the cam ring is turned to release the balls from locking position.

It will now be apparent that several forms of coupling members herewith shown and described will provide for the improvements and advantages hereinbefore mentioned in a particularly efficacious manner.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a coupling, a female coupling member having ball-retaining openings therein, a male coupling member having a ball-receiving groove therein, balls mounted in said openings for movement into and out of said groove to lock and release said male member, and a rotary cam ring mounted on said female member and surrounding said balls so as to retain them in said openings, being rotatable one direction to force the balls into and hold them in said groove and rotatable in the opposite direction to release said balls for movement out of said groove, there being ball-locking depressions on said cam ring in which said balls seat when the ring is turned to a position to force the balls into said groove.

2. In a coupling, a female coupling member having ball-retaining openings therein, a male coupling member having a ball-receiving groove therein, balls mounted in said openings for movement into and out of said groove to lock and release said male member, said openings being of smaller diameter than the diameter of the balls to prevent the balls from passing through said openings, and a rotary cam ring mounted on said female member and surrounding said balls so as to retain them in said openings, being rotatable in one direction to force the balls into and hold them in said groove and rotatable in the opposite direction to release said balls for movement out of said groove, there being ball-locking depressions in said cam ring in which said balls will seat when the cam ring is turned to a position for forcing said balls into said groove, and a resilient member arranged to yieldingly resist the forcing of said balls into said groove and into said depressions.

3. In a coupling, a female coupling member having ball-retaining openings therein, a male coupling member having a ball-receiving groove therein, balls mounted in said openings for movement into and out of said groove to lock and release said male member, a rotary cam ring mounted on said female member and surrounding said balls so as to retain them in said openings, being rotatable in one direction to force the balls into and hold them in said groove and rotatable in the opposite direction to release said balls for movement out of said groove, and a resilient member arranged to yieldingly hold the male and female members in a position in which the openings and groove are out of registry and acting to resist the forcing of said balls into said groove.

4. In a coupling, a female coupling member having ball-retaining openings therein, a male coupling member having a ball-receiving groove therein, balls mounted in said openings for movement into and out of said groove to lock and release said male member, a rotary cam ring mounted on said female member and surrounding said balls so as to retain them in said openings, being rotatable in one direction to force the balls into and hold them in said groove and rotatable in the opposite direction to release said balls for movement out of said groove, there being locking depressions in said cam ring, and a resilient member arranged to yieldingly resist the forcing of said balls into said groove, said resilient member, said openings, said balls, said depressions and said groove being so relatively arranged that on the forcing of the balls into the groove the male member is moved axially into the female member to tighten the connection of said coupling member and the balls will snap into said depressions against the action of said resilient member to lock the coupling members together.

5. In a coupling, a female coupling member having ball-retaining openings therein, a male coupling member having a ball-receiving groove therein, balls mounted in said openings for movement into and out of said groove to lock and release said male member, a rotary cam ring mounted on said female member and surrounding said balls so as to retain them in said openings, being rotatable in one direction to force the balls into and hold them in said groove and rotatable in the opposite direction to release said balls for movement out of said groove, there being locking depressions in said cam ring, and a resilient member arranged to yieldingly resist the forcing of said balls into said groove, said resilient member being mounted internally of said female member for contact with the end of the male member to form a fluid-tight seal and operating to snap the balls into said depressions to lock the coupling members together.

6. In a coupling, a female coupling member having ball-retaining openings therein, a male coupling member having a ball-receiving groove therein, balls mounted in said openings for movement into and out of said groove to lock and release said male member, a rotary cam ring mounted on said female member and surrounding said balls so as to retain them in said openings, being rotatable one direction to force the balls into and hold them in said groove and rotatable in the opposite direction to release said balls for movement out of said groove, and a resilient member arranged between said coupling members so as to yieldingly resist the insertion of said male member into the female member to a position in which said balls are forced by said cam ring to seat adjacent the bottom of said groove, there being locking depressions in said cam ring in which said balls will seat to lock the coupling members together, said cam ring having a cam surface which is effective for exerting an increasing inward pressure on said balls after said balls are forced into said groove upon continued turning of said ring, said groove having a ball contacting surface productive of relative axial movement of said coupling members so as to compress said resilient member on the turning of said ring to the point at which said balls are locked in said depressions.

7. In a coupling, a female coupling member having ball-retaining openings therein, a male coupling member having a ball-receiving groove therein, balls mounted in said openings for movement into and out of said groove to lock and release said male member, said openings being of smaller diameter than the diameter of the balls to prevent the balls from passing through said openings, a rotary cam ring mounted on said female member and surrounding said balls so as to retain them in said openings, being rotatable one direction to force the balls into and hold them in said groove and rotatable in the opposite direction to release said balls for movement out of said groove, and a resilient member arranged between said coupling members so as to yieldingly resist relative axial movement of said coupling members to a position in which said balls are forced by said cam ring to seat in said groove, there being ball-receiving depression interiorly of said cam ring in which said balls will seat with a snap action to lock the coupling members together.

8. In a coupling, a female coupling member having ball-retaining openings therein, a male coupling member having a ball-receiving groove therein, balls mounted in said openings for movement into and out of said groove to lock and release said male member, said openings being of smaller diameter than the diameter of the balls to prevent the balls from passing through said openings, a rotary cam ring mounted on said female member and surrounding said balls so as to retain them in said openings, being rotatable one direction to force the balls into and hold them in said groove and rotatable in the opposite direction to release said balls for movement out of said groove, and a resilient member arranged between said coupling members so as to yieldingly resist the insertion of said male member into the female member to a position in which said balls are forced by said cam ring to seat adjacent the bottom of said groove, said resilient member being in the form of a marcel spring ring, said female member having an internal groove therein in which said resilient member is seated so that it will be abutted and compressed by the inserted end of said male member.

9. In a coupling, a female coupling member having ball-retaining openings therein, a male coupling member having a ball-receiving groove therein, balls mounted in said openings for movement into and out of said groove to lock and release said male member, said openings being of smaller diameter than the diameter of the balls to prevent the balls from passing through said openings, a rotary cam ring mounted on said female member and surrounding said balls so as to retain them in said openings, being rotatable one direction to force the balls into and hold them in said groove and rotatable in the opposite direction to release said balls for movement out of said groove, and a resilient member arranged between said coupling members so as to yieldingly resist the insertion of said male member into the female member to a position in which said balls are forced by said cam ring to seat in said groove, said resilient member being in the form of a coiled spring surrounding said male member, said male member having a second groove therein, and a flange axially spaced from said second groove, an abutment ring mounted in said groove for axial movement on said male member adapted to abut the outer end of said female member, said resilient member being disposed between said abutment ring and said flange whereby said abutment ring will yieldingly abut the female member.

10. In a coupling, a female coupling member having an annular flange externally thereof and a plurality of ball-receiving openings extending radially through the cylindrical wall thereof, a male coupling member having a ball-receiving groove, a cam ring surrounding and rotatably supported on said flange and having a counter bore adjacent one end providing a shoulder for abutting one side of said flange, said ring having an annular groove in the counterbore thereof, a snap ring mounted in said annular groove so as to abut the other face of said flange to hold the cam ring in place on the female member, balls mounted in said ball-receiving opening and held therein by said cam ring subject to radial movement into and out of said ball-receiving groove upon rotation of said cam ring.

HAROLD G. McILROY.

REFERENCES CITED

The following references are of record in the file of this patent:

UNITED STATES PATENTS

| Number | Name | Date |
| --- | --- | --- |
| 1,274,406 | Frazier | Aug. 6, 1918 |
| 1,879,364 | Lomar | Sept. 27, 1932 |
| 2,135,223 | Scheiwer | Nov. 1, 1938 |
| 2,377,812 | Scheiwer | June 5, 1945 |